Figure 1:
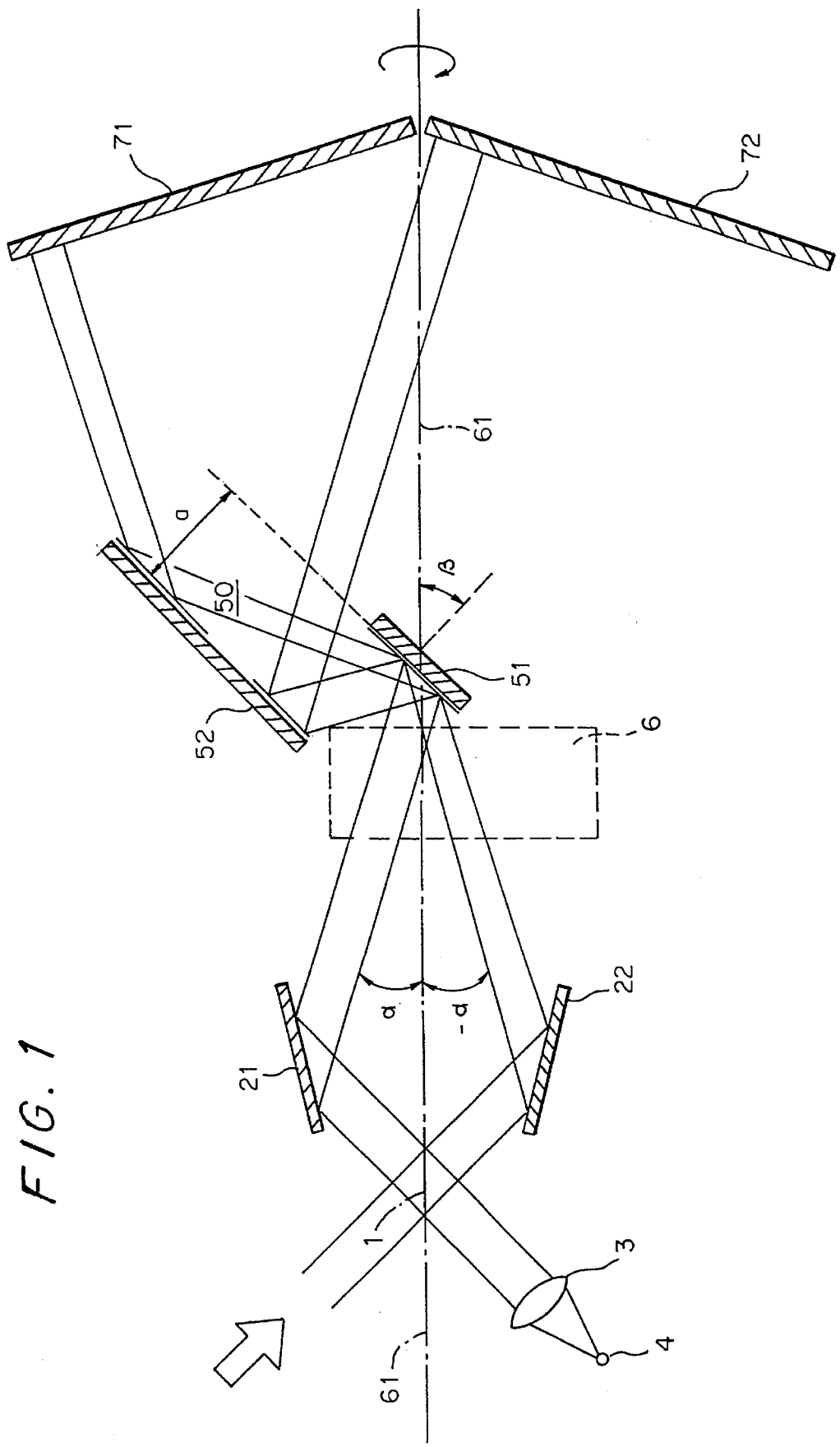

United States Patent [19]
Tank et al.

[11] Patent Number: 5,457,529
[45] Date of Patent: Oct. 10, 1995

[54] ROTATING MIRROR INTERFEROMETER

[75] Inventors: Volker Tank, Echingg; Peter Haschberger, Gauting; Burkhard Jansen, Hilter; Erwin Lindermeir, Augsburg; Klaus Scheider, Hergatz, all of Germany

[73] Assignee: Deutsche Forschungsanstalt für Luft- und Raumfahrt, Köln, Germany

[21] Appl. No.: 271,447

[22] Filed: Jul. 7, 1994

[30] Foreign Application Priority Data

| Jul. 7, 1993 | [DE] | Germany | 43 22 682.5 |
| Jul. 7, 1993 | [DE] | Germany | 43 22 683.3 |
| Jul. 7, 1993 | [DE] | Germany | 43 22 687.6 |

[51] Int. Cl.$^6$ .................................................. G01B 9/02
[52] U.S. Cl. ............................................. 356/346; 356/345
[58] Field of Search .................................. 356/345, 346

[56] References Cited

U.S. PATENT DOCUMENTS

| 4,329,055 | 5/1982 | Schaefer et al. | 356/346 |
| 4,652,130 | 3/1987 | Tank . | |
| 4,654,530 | 3/1987 | Dybwad | 356/346 |
| 4,705,397 | 11/1987 | Tsuchiya et al. | 356/345 |
| 4,915,502 | 4/1990 | Brierley | 356/346 |
| 5,066,990 | 11/1991 | Rippel | 356/346 |
| 5,148,235 | 9/1992 | Tank . | |

FOREIGN PATENT DOCUMENTS 2456649  5/1975  Germany .

Primary Examiner—Samuel A. Turner
Assistant Examiner—Robert Kim
Attorney, Agent, or Firm—Browdy and Neimark

[57] ABSTRACT

In a Michelson interferometer, two plane mirrors of the mirror unit (50) are embodied as two plane mirrors (51, 52) of different sizes, disposed eccentrically and parallel to one another. A hollow shaft (63), rotatably supported in a bearing block (62) and driven by a drive unit (65), is also provided, which is disposed between a beam splitter and the mirror unit (50) and whose axis of rotation (61) coincides with the axis of rotation of the mirror unit (50). The mirror unit (50) is secured to the hollow shaft (63) in such a way that the axis of rotation (61) of the hollow shaft passes through the mirror face of the smaller plane mirror (51), whose axis of rotation forms an acute angle ($\beta$) with the vertical to the smaller plane mirror (51), so that the two beams formed at the beam splitter (1) pass, via the tilted mirrors, through the hollow shaft (63) to strike the centrally disposed mirror face of the smaller plane mirror (51), are reflected by it to the opposite mirror face of the larger plane mirror (52) and from there to two stationary plane mirrors (71, 72) in such a way that they strike the stationary plane mirrors (71, 72) vertically, and—reflected by those mirrors—take the same path in the opposite direction, recombine at the beam splitter, and are focused by means of an optical element onto a detector (4).

7 Claims, 8 Drawing Sheets

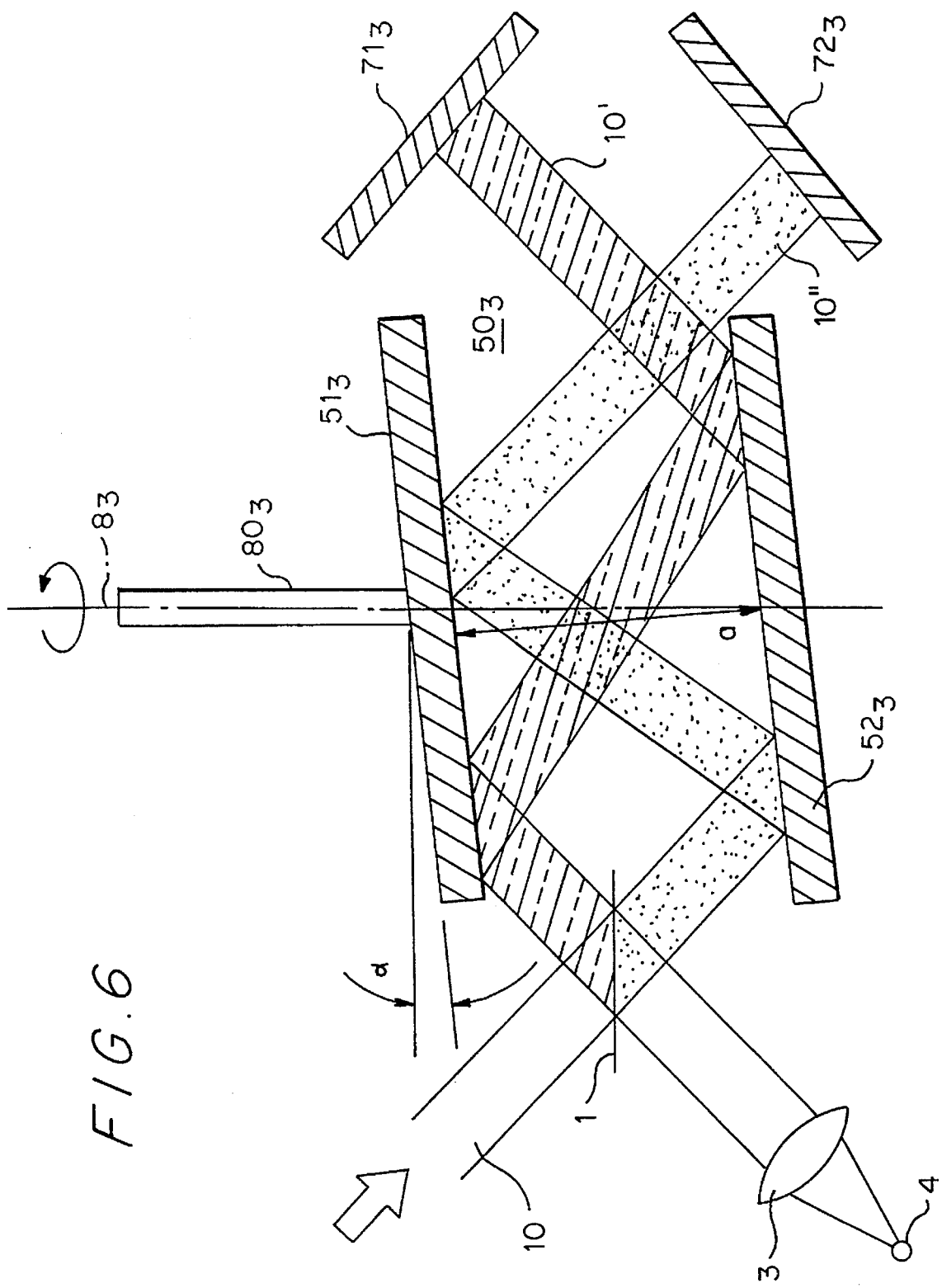

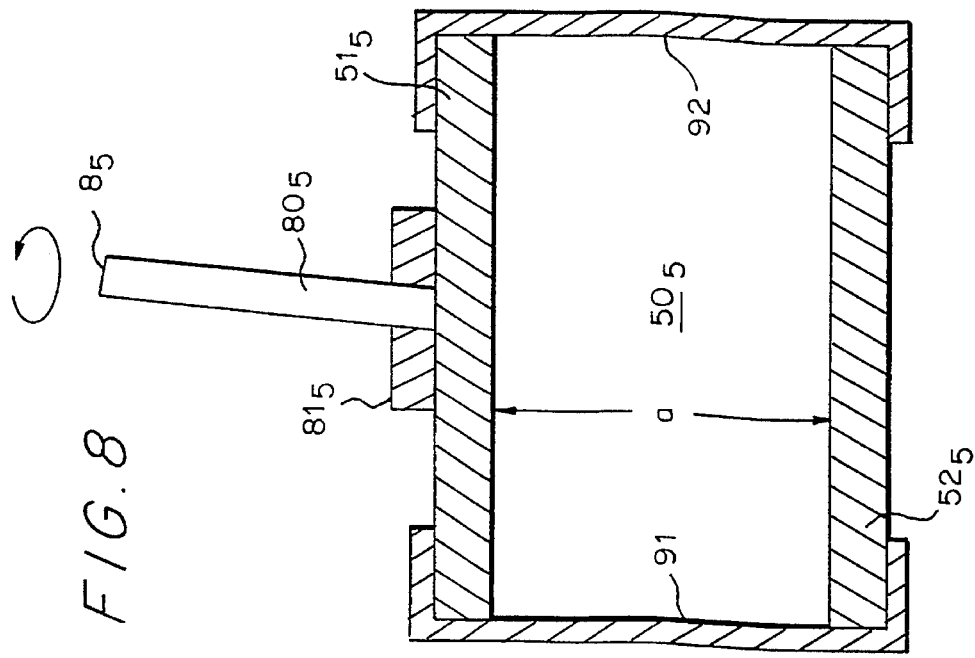
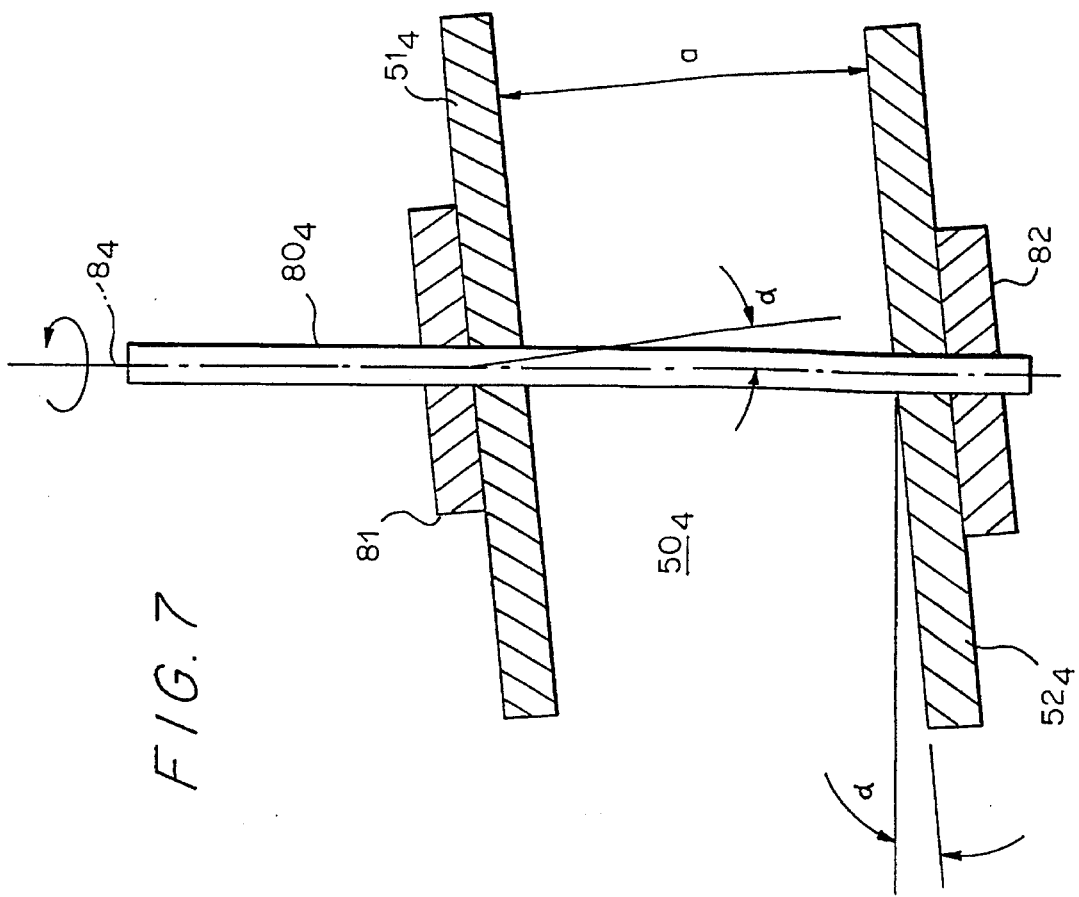

ROTATING MIRROR INTERFEROMETER

The invention relates to a Michelson interferometer, in which an optical path difference is generated by means of a mirror unit that can be set to rotation.

German Patent Disclosure DE 34 31 040 C2, European Patent Disclosure EP 01 46 768 A2, and German Patent Disclosure DE 40 13 399 C1 for instance disclose Michelson interferometers in which optical path differences are generated by rotating retroreflectors. In these known interferometers, retroreflectors are employed, which rotate eccentrically on a tilt. To generate greater optical path differences or in other words higher spectral resolutions, two or more retroreflectors are set into asynchronous rotation, in terms of the optical path change in the two interferometer arms, and a fixed phase relationship among the various rotational motions with respect to one another must be adhered to.

These known Michelson interferometers with rotating retroreflectors have various disadvantages:

1. To generate high spectral resolution, such an interferometer cannot be operated with only one retroreflector; instead, two or more of these relatively expensive elements are required.

2. In order to adhere to the fixed phase relationship among the various rotational motions of the two or more reflectors relative to one another, as required, complicated provisions must be made. An elegant solution would be to drive each retroreflector with its own stepping motor and to provide for the "electronic coupling" of all the motors with one another by means of a common control clock pulse for all the motors. The mechanical vibrations from the incremental operation of the various stepping motors are transmitted to the entire structure in a way that perturbs the measurement signal and must therefore be eliminated by additional complicated and expensive mechanical damping provisions. All the effort and expense would moreover be increased by each additional drive motor required. Furthermore, stepping motors are fundamentally more expensive than comparable direct voltage motors, which are sufficient for operation with only one retroreflector.

If two or more retroreflectors are to be driven by only one motor, then coupling via a gear is necessary. This again entails greater effort and expense and creates additional sources of trouble, from the transmission of gear play and gear vibration to the structure.

3. Moreover, it is considered especially disadvantageous that as a result of each further reflector, its optical errors cause additional worsening of the quality of the optical signal of the apparatus. To overcome this disadvantage, retroreflectors of extremely high quality may be used, but the result once again is an extremely expensive apparatus.

4. In the known interferometers having only one rotating retroreflector, it is moreover disadvantageous that in order to avoid undesirably large mechanical dimensions of the apparatus, a retroreflector, although fixed, is installed in the second interferometer arm; it serves above all to fold the optical path and thereby enable small mechanical structural sizes. This has the disadvantages of a second reflector as already discussed above.

5. Another disadvantage in the known interferometer having only one rotating retroreflector, along which both interferometer arms run, is that very high spectral resolution requires a very large retroreflector, resulting in undesirably large mechanical dimensions of the apparatus and high production costs.

From German Patent Disclosure DE 24 56 649 A1, an apparatus for measuring a rotational angle of a shaft with the aid of an interferometer is also known. This known interferometer has not only a beam splitter, a focusing lens, a detector for detecting the signal radiation, two plane mirrors and a radiation source, but also a mirror element which can be set into rotation by a drive unit, and in which two mirror faces opposing one another at a predetermined distance are provided, of which the mirror face located nearer the beam splitter is embodied in the form of a ring, and by way of which both beam halves coming from the beam splitter are directed. Moreover, an axis of rotation of the drive unit is aligned in the same plane as the beam splitter, and a vertical to the axis of rotation forms an acute angle with one mirror face; in addition, the drive unit is disposed on the back side of the mirror element, remote from the beam splitter. The plane mirrors are also disposed on different sides, facing one another, of the axis of rotation and vertically to the beams arriving from the beam splitter.

It is therefore the object of the invention to create a Michelson interferometer of compact structure, with little technological effort or expense and with low vulnerability to malfunction. According to the invention, this object is attained in a Michelson interferometer as defined by the characteristics of the bodies of claims 1 and 4. Advantageous further features of the invention are the subject of claims 2, 3, or 5–7, which are dependent directly or indirectly on claims 1 and 4.

In a first embodiment of an interferometer according to the invention, a mirror unit that can be set into rotation is provided, both of whose plane mirrors, which are preferably circular of elliptical, are embodied as two plane mirrors of different sizes, disposed eccentrically to one another. Moreover, in the first embodiment of the interferometer according to the invention, a hollow shaft rotatably supported in a bearing block and driven by it is associated with the drive unit; the hollow shaft is disposed between the beam splitter and the mirror unit, and its axis of rotation coincides with the optical axis of the mirror unit. The mirror unit is secured to the hollow shaft in such a way that the axis of rotation of the hollow shaft passes through the mirror face of the smaller plane mirror and forms an acute angle with the vertical to the smaller plane mirror.

The Michelson interferometer according to the invention, in the first embodiment, therefore has the following advantages:

1. The demands in terms of precision made of a rotating mirror unit, in other words, in terms of defects of less than one arc second in the parallelism of incident and exiting beams, can be met at considerably less expense with the two plane mirrors of the first embodiment according to the invention than with three mirror units in the form of retroreflectors.

2. In this interferometer according to the invention, the beam passing through—in contrast to passage through a rotating retroreflector—no longer strikes the joint between mirror edges; thus there is no longer any influence from inaccurately machined edges, and the effort and expense otherwise required to produce precise edges becomes unnecessary.

Since in this interferometer according to the invention the beams now travel via two mirror faces of the rotating element, rather than via three reflectors as in known embodiments of such interferometers, the number of reflections for each beam half decreases by two; as a result, the radiometric-optical losses are less, and the beam divergence is not impaired as much.

In a second and third embodiment of an interferometer according to the invention, a plane-parallel plate that can be set into rotation by a motor is provided that is mirror-coated on both sides; that is, in some regions, the two outer faces of the plane-parallel plate are mirror-coated, preferably in the form of circular or elliptical rings, so that exiting beams are reflected outward from the mirror-coated annular regions of the plane-parallel plate.

With the second and third embodiments according to the invention, an interferometer with a mirror element that can be set into rotation is created that has high spectral resolution with a small structural size. Moreover, this can be done at less expense and effort than before, and at the same time there are fewer possible sources of trouble, because the drive, for instance, can be done with a simple direct voltage motor, without a troublesome gear or stepping controls.

In the fourth through sixth embodiments of an interferometer according to the invention, in which the two interferometer arms extend between two parallel plane mirrors, a pair of round plane mirrors disposed parallel to one another is provided; to generate a path difference, they jointly but continuously execute above all a rotational motion, which takes place about an axis of rotation that is inclined from the vertical to the mirror faces by a small angle $\alpha$. By means of the angle of inclination $\alpha$ and by the spacing a between opposed mirror faces, the attainable path difference and the thereby attainable spectral resolution are determined.

Figure 2:
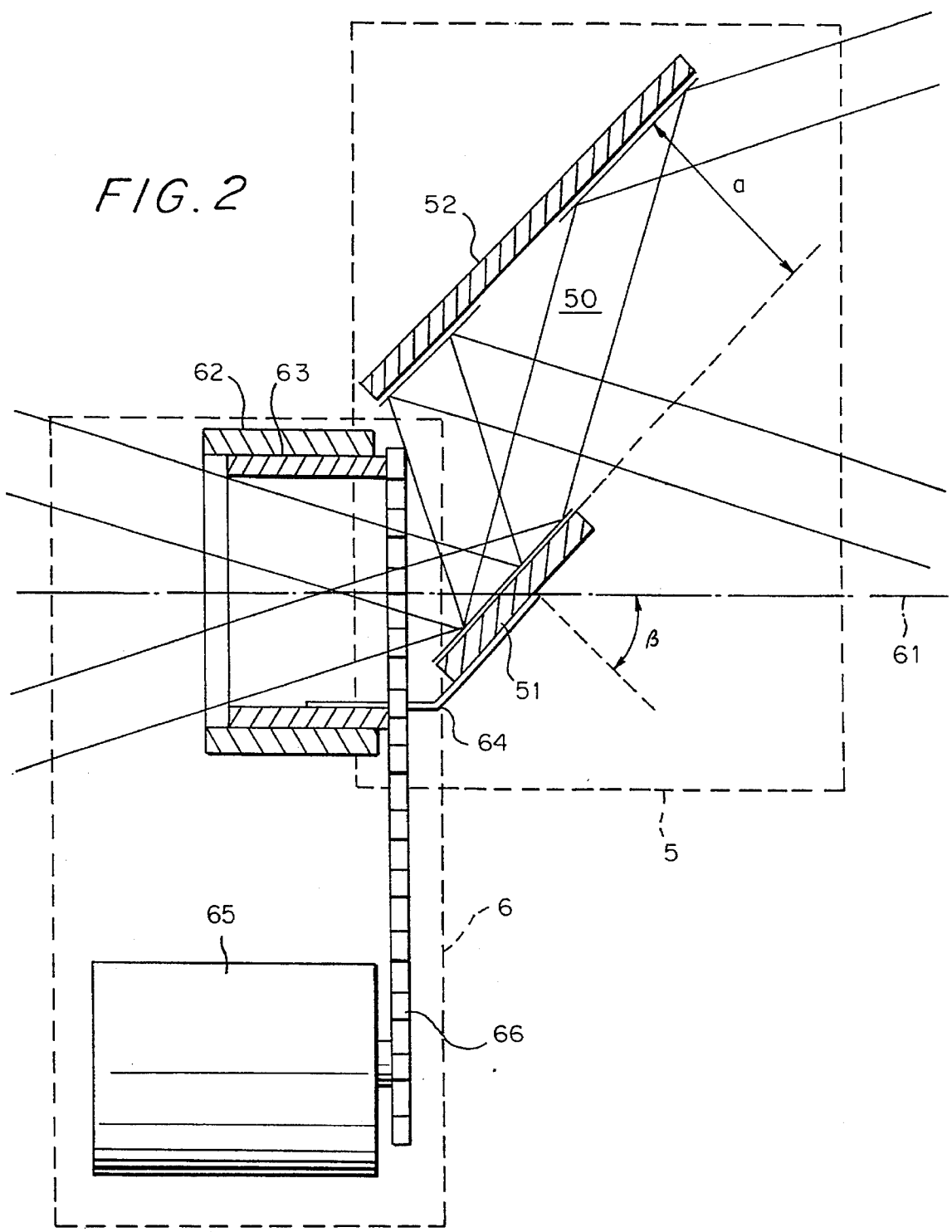
Figure 3:
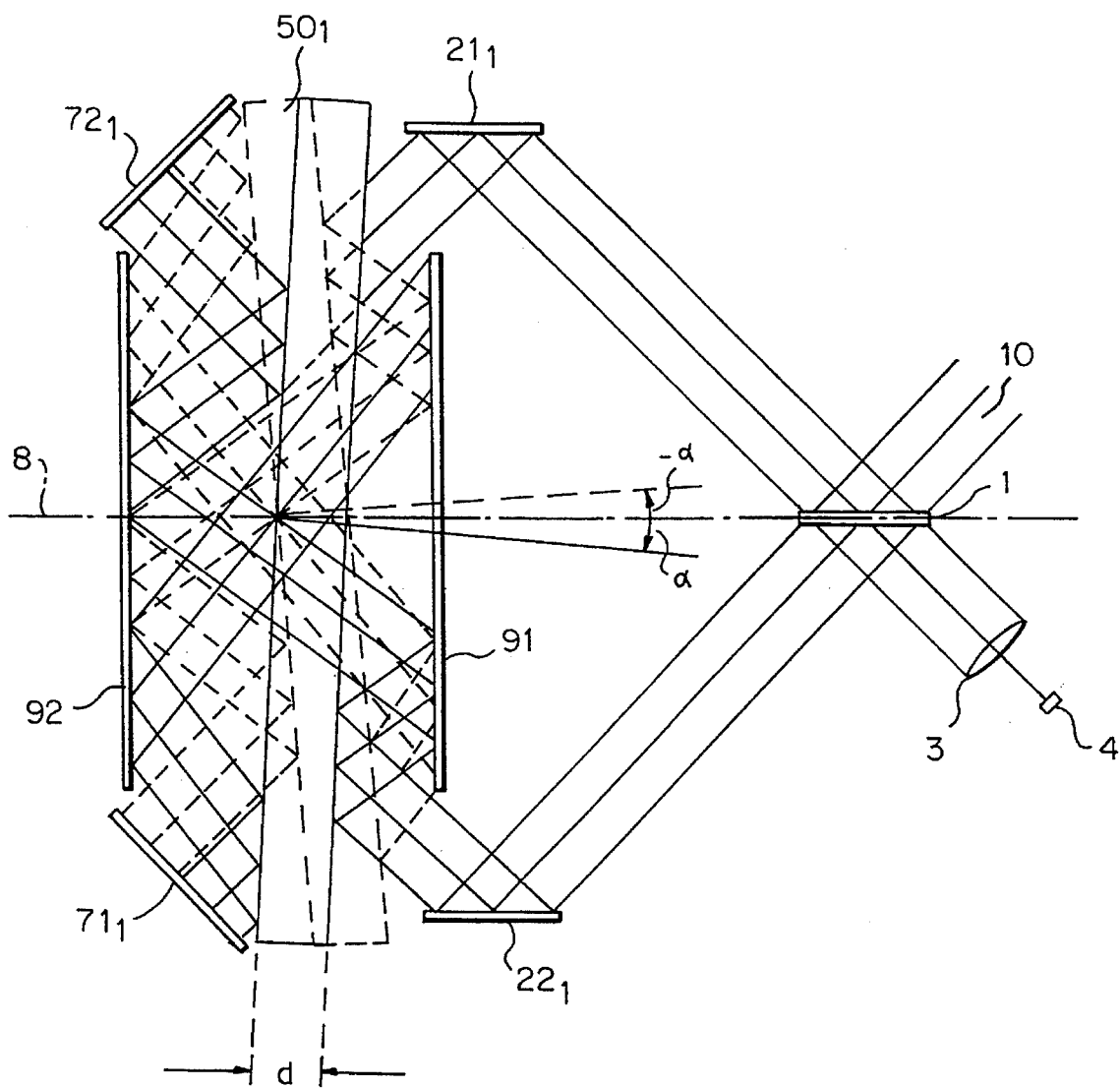
Figure 4:
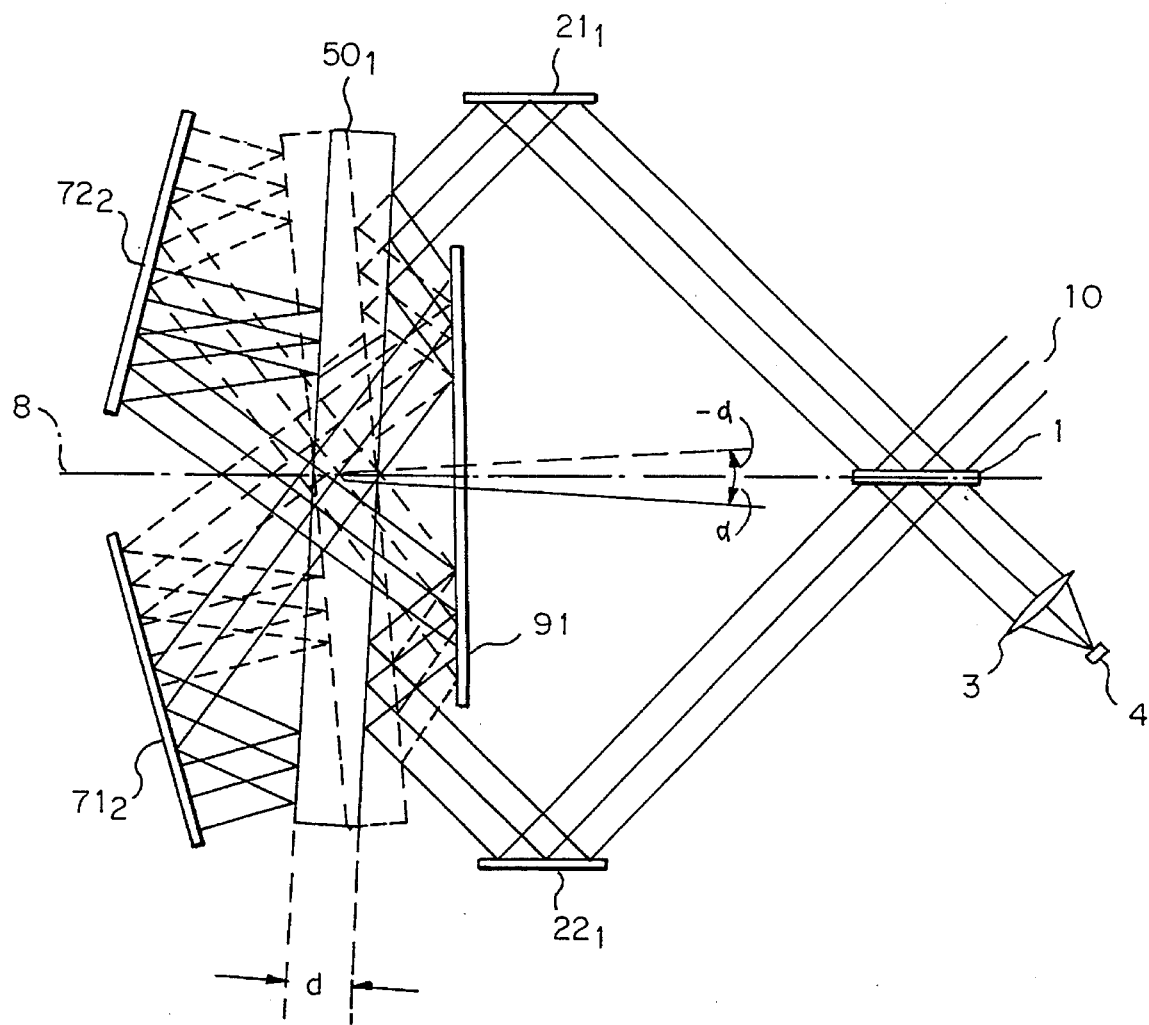
Figure 5:
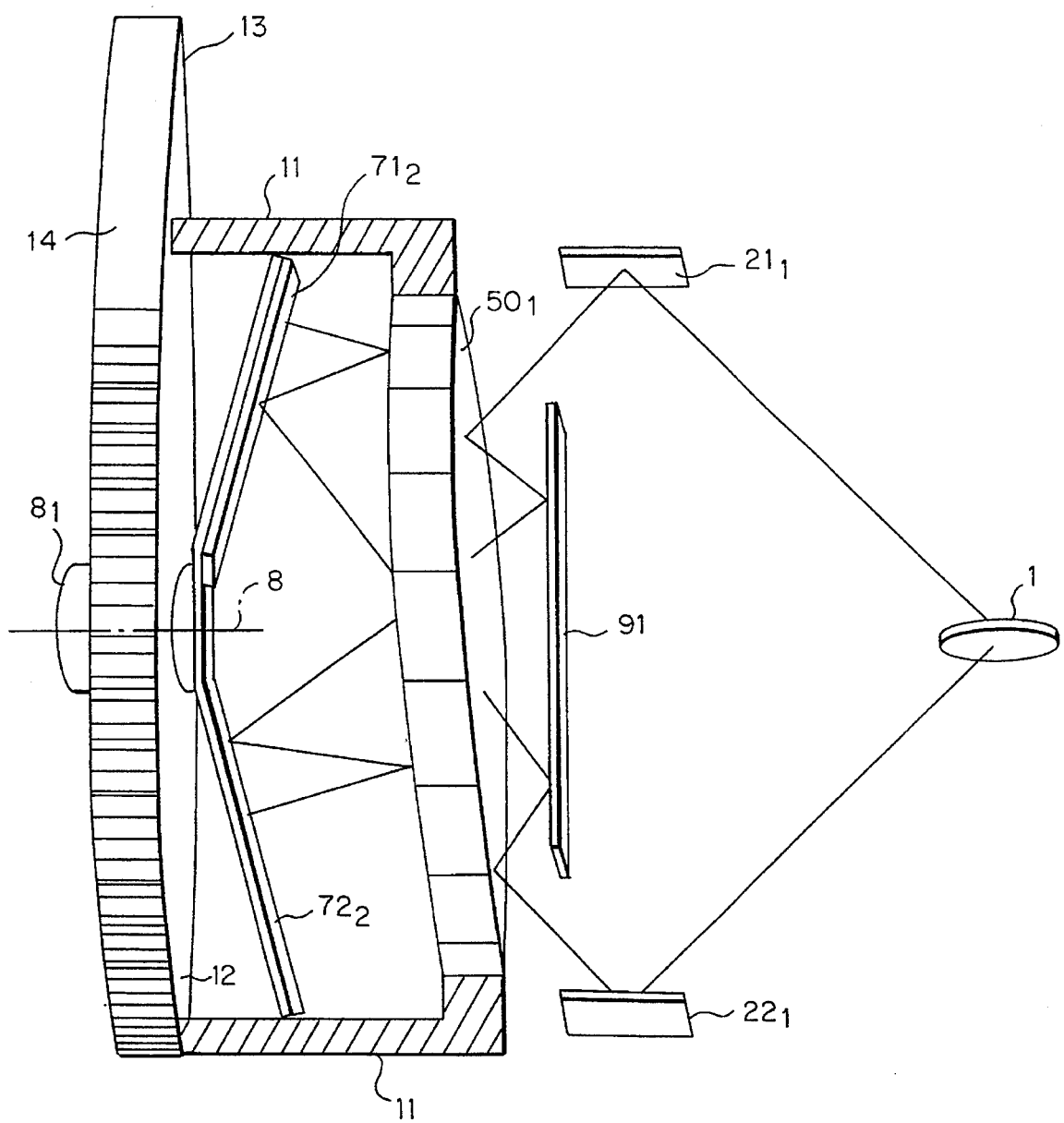
Figure 9:
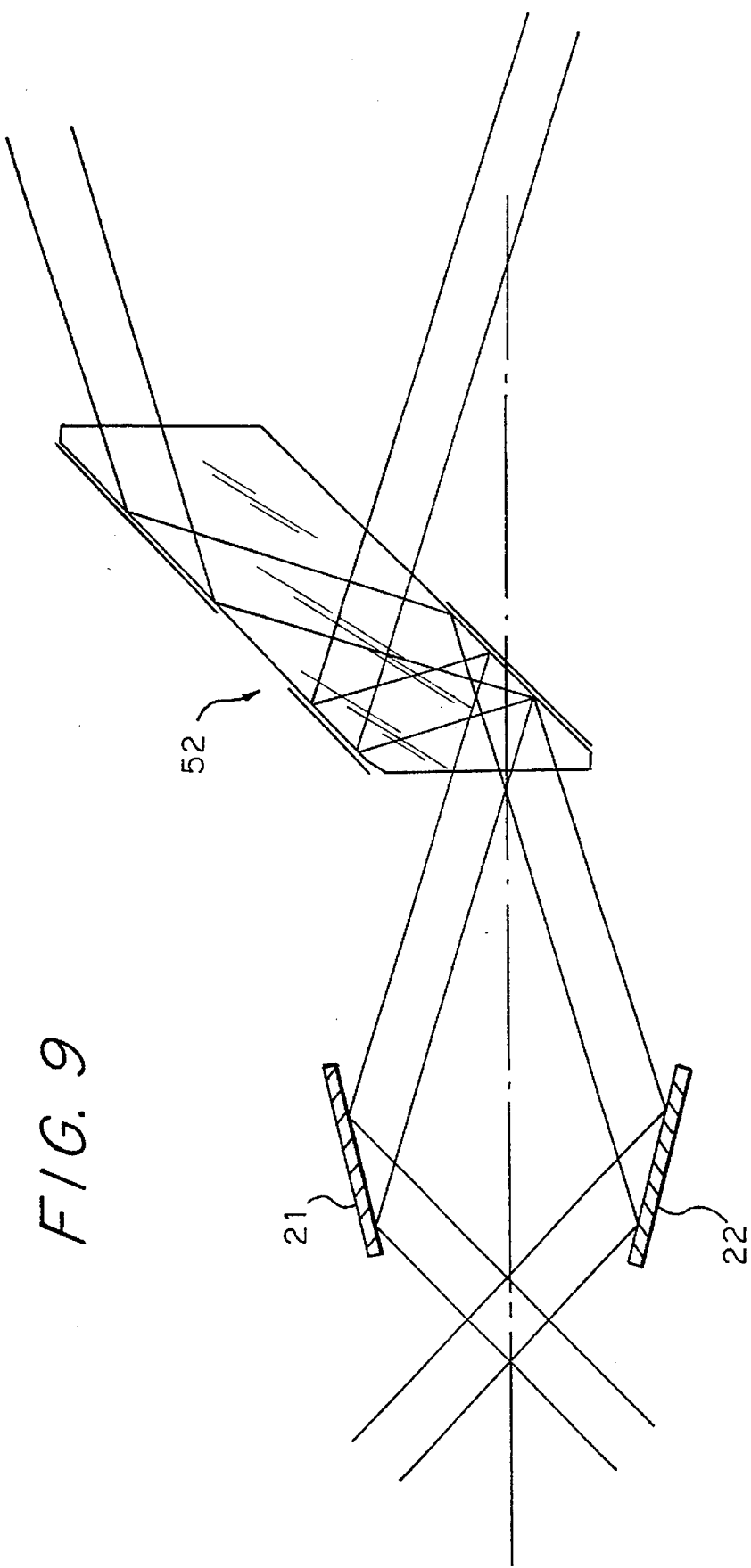

The invention is described in detail below in terms of preferred embodiments, in conjunction with the accompanying drawings. Shown are:

FIG. 1, a schematic illustration of a first embodiment of an interferometer with a mirror unit that can be set to rotation;

FIG. 2, a detailed view of the mirror unit of FIG. 1 with an associated bearing and drive unit;

FIG. 3, a schematic illustration of a second preferred embodiment of an interferometer according to the invention, with a plane-parallel plate as the rotating mirror element;

FIG. 4, a schematic illustration of a third preferred embodiment of an interferometer according to the invention, with a plane-parallel plate as the rotating mirror element;

FIG. 5, a schematic perspective view of a basic layout of the embodiment of FIG. 4;

FIG. 6, a schematic view of a further, fourth embodiment of an interferometer according to the invention, having a rotating mirror element comprising two plane mirrors with their mirror-coated faces toward one another;

FIG. 7, a schematic view of a fifth preferred embodiment of a rotating mirror element of the interferometer according to the invention as shown in FIG. 6, and FIG. 8, a further schematic view of a sixth preferred embodiment of a rotating mirror element of the interferometer according to the invention of FIG. 6;

FIG. 9, a view of beams passing through a solid transparent rotatable mirror.

In the first embodiment shown in FIG. 1, a rotating mirror unit 5 comprises a small plane mirror 51 and a larger plane mirror 52, whose mirror faces are oriented toward one another and which are spaced apart, parallel from one another, by a distance a. The two plane mirrors 51 and 52 are retained in a common mount, not shown in further detail.

As seen from FIG. 2, a retainer for the mirror unit 5, formed by the two plane mirrors 51, 52, has a mounting plane 64, which is secured to a hollow shaft 63 that in turn is rotatably supported in the bearing block 62 of a bearing and drive unit 6. The axis of rotation 61 of the bearing and drive unit 6 extends concentrically with the hollow shaft 63. By means of a motor 65, the hollow shaft 63 and thus the mirror unit 5 are set into rotation via a drive belt 66, for instance in the form of a toothed belt or V belt or the like, and via pulleys (not shown), such as toothed belt and V-belt disks.

Opposite the end of the hollow shaft 63 remote from the mirror unit 5, a beam splitter 1 is disposed such that the axis of rotation 61 of the bearing and drive unit 6 passes through the plane of the beam splitter 1. (A circular beam splitter 1 would be divided by the axis of rotation 61 into two equal-sized semicircular segments.) One folding mirror 21 and 22 is disposed on each side of the axis of rotation 61, axially symmetircally, between the beam splitter 1 and the hollow shaft 63. Two stationary plane mirrors 71 and 72 are disposed facing the mirror unit 5, at a predetermined distance from the hollow shaft 63. By the choice of the direction of the incident beam striking the beam splitter 1, and also by the geometrical dimensioning of all the optical components and of their geometrical relationship with one another and in terms of the optical axis and the axis of rotation 61, the following function is assured:

A beam striking the beam splitter 1 is subdivided by it (beam splitter 1) into one reflected component and one transmitted component. Both halves of the beam, after reflection at the two plane folding mirrors 21 and 22, pass through the hollow shaft 63 and form the angle $\alpha$ or $-\alpha$ with the axis of rotation 61. Both halves of the beam strike the smaller plane mirror 51, the normal to whose surface is inclined by an angle $\beta$ relative to the axis of rotation 61, centrally at an angle ($\beta+\alpha$) or ($\beta-\alpha$) and thus enter the mirror unit 5. Both halves of the beam are reflected toward the larger plane mirror 52 and are reflected by it onto the stationary plane mirrors (71 or 72) in such a way that the beam halves strike them vertically. From the two stationary plane mirrors 71 and 72, the two halves of the beam are reflected and travel the same path in the opposite direction, then recombine at the beam splitter 1, and finally are focused by an optical element 3 onto a detector 4.

The beam path takes the same course if the mirror unit 5 is set to rotation about the axis of rotation 61 by means of the bearing and drive unit 6. As a result, the lengths of the paths travelled by the beam halves change so that one path becomes shorter while the other becomes longer, so that their difference varies periodically and continuously between a maximum and zero. The beam halves or portions of them are not allowed to take paths other than those described in any rotational angle position.

By means of the angles $\alpha$ and $\beta$ with respect to the axis of rotation 61 and the spacing a between the two plane mirrors 51 and 52, the attainable path difference and thus the spectral resolution are defined.

Instead of the two plane mirrors 51 and 52, a plane-parallel plate mirror-coated on the inside on both outer surfaces and not shown in further detail here may be used as the rotating mirror unit; its two mirror faces take on the function of the plane mirror faces 51 and 52. The mirror coating of the mirror face, which in function corresponds to the mirror face of the first, smaller plane mirror 51, is limited to the region of the incident beam, so that the exiting beam is not hindered. The material comprising the plane-parallel plate should not exhibit any dispersion (a wavelength-independent index of refraction) in the wavelength range in which the interferometer is used.

A maximum optical path difference $s_{max}$ results for the first embodiment according to the invention of an interferometer, at symmetrical angles of incidence ($\alpha$, $-\alpha$), as follows:

$$s_{max} = 16 \cdot a \cdot \sin \alpha \cdot \sin \beta$$

in which a is the distance or spacing between the two rotating plane mirrors 51 and 52, and α must be smaller than β.

For instance, if a=.5 cm, α=15°, and β=45°, then the maximum resultant path difference is as follows:

$s_{max}$=10.25 cm.

In a second and third embodiment of an interferometer according to the invention, shown in FIGS. 3 and 4, a mirror element $50_1$, which in a manner not shown in detail can be set into rotation by means of a motor, such as a direct current motor, comprises a plane-parallel plate mirror-coated on both sides, with a thickness d and made of a material that is permeable to the signal radiation, with dispersion that is negligible in the spectral range of interest here. The mirror-coated outer faces on both sides of the plane-parallel plate take the form of a ring, preferably but not necessarily a concentric, circular or elliptical ring.

The mirror-coated and non-mirror-coated faces are embodied relative to one another, in terms of their length and disposition, in such a way that incident and exiting beams are always treated the same over their entire cross section; that is, a beam strikes either mirror-coated faces or non-mirror-coated faces, and upon leaving the plane-parallel plate $50_1$ entirely and at a predetermined angle strikes the boundary face between the air and the radiation-permeable material, or between the radiation-permeable material and the air. Moreover, an axis of rotation 8, and the beam splitter 1 are located in the same plane. The axis of rotation 8 forms a predetermined angle α with the normal to the mirror element $50_1$.

To avoid losses at the transition between the air and the plate material, or between the plate material and the air, and to avoid negative influences of dispersion, in an advantageous further feature of the invention a continuous, concentric, typically frustoconical recess is embodied in the region of the non-mirror-coated faces of the mirror element $50_1$. In that case, the mirror element may then also comprise a material that is impermeable to radiation.

The second embodiment (see FIG. 3) of the interferometer according to the invention has a total of six plane mirrors and the mirror element $50_1$ that can be set into rotation as its essential elements. The first and second plane mirrors $21_1$ and $22_1$, acting as folding mirrors are preferably disposed parallel and axially symmetrically on different, opposed sides of the axis of rotation 8. In addition, the third and fourth plane mirrors $71_1$ and $72_1$ are likewise disposed on different, opposed sides of the axis of rotation 8 of the mirror element $50_1$, asymmetrically and vertically to the beam halves formed by the beam splitter and at an angle of 45° from the axis of rotation 8. The fifth and sixth plane mirrors 91 and 92 are oriented vertically to the axis of rotation 8 and are disposed before and after the mirror element $50_1$ from the standpoint of the beam splitter 1.

In the interferometer according to the invention, in accordance with the second embodiment, a beam 10 striking the beam splitter 1 under 45° is split into one reflecting beam half and one transmitting beam half. The beam halves arriving from the beam splitter 1 are reflected by the plane mirrors $21_1$ and $22_1$, acting as folding mirrors, to the mirror element $50_1$ and by it to the fifth plane mirror 91, disposed vertically to the axis of rotation 8 and disposed between the mirror element $50_1$ and the beam splitter 1. The beam halves reflected by the fifth plane mirror 91 thereupon pass through the non-mirror-coated face or through a recess, not shown in detail, of the rotating mirror element $50_1$ to reach the sixth mirror 92, disposed axially symmetrically and vertically to the axis of rotation 8. From there, the two beam halves are reflected onto the mirror face, on the side remote from the beam splitter 1, of the mirror element $50_1$. From the mirror element $50_1$, the beam halves are then carried on to the two axially symmetrically disposed plane mirrors $71_1$ and $72_1$, which in FIG. 3 are disposed laterally outside the space between the mirror element $50_1$ and the sixth plane mirror 92. The beam halves vertically strike the two plane mirrors $71_1$ and $72_1$ and than—reflected by the two plane mirrors $71_1$ and $72_1$—pass in the opposite direction along the same course, recombine at the beam splitter 1, and are focused onto the detector 4 by the optical element 3 in the form of a focusing lens arrangement.

Since during operation the mirror element $50_1$ is set to rotation about the axis of rotation 8 by means of a drive unit, not shown, in the form of a direct current motor, the lengths of the paths traversed by the two beam halves become shorter and longer contrarily, and their difference changes periodically and continuously between maximum and zero. The attainable optical path difference in this embodiment of an interferometer, and hence the attainable spectral resolution, are determined by the acute angle α between the axis of rotation 8 and the normal to the mirror element $50_1$, and by the thickness d of the plane-parallel plate $50_1$ and the spacing between the two plane mirrors 91 and 92 disposed vertically to the axis of rotation 8. As a result, the diameter of the mirror element $50_1$ is then simultaneously defined as well.

The third preferred embodiment (see FIG. 4) of the interferometer according to the invention has only five plane mirrors and the rotating mirror element $50_1$. The third embodiment differs from the second embodiment described above in having a different orientation of plane mirrors $71_2$ and $72_2$, which correspond to the plane mirrors $71_1$ and $72_1$ and which in the third embodiment are inclined to the normal to the axis of rotation 8 by a larger angle, such as 75°, to the normal of the axis of rotation 8, than in the first embodiment where the angle was preferably 45°, so that the sixth plane mirror 92 required in the second embodiment is omitted.

Because of the different orientation of the two axially symmetrically disposed plane mirrors $71_2$ and $72_2$ in the third embodiment, the beam halves reflected by the fifth plane mirror 91, disposed vertically to the axis of rotation 8, are reflected through the non-mirror-coated face or through the recess in the rotating mirror element $50_1$ to reach the two plane mirrors $71_2$ and $72_2$. From there, the two beam halves are reflected back again to the mirror face on the back side of the mirror element $50_1$ and from that mirror face back to the plane mirrors $71_2$ and $72_2$, where they now strike vertically. The beam halves are then reflected back into themselves and travel in the opposite direction along the same path to the beam splitter 1, where they recombine and are then focused by the optical element 3 onto the detector 4.

In the third embodiment as well, the mirror element $50_1$ is set to rotation about the axis of rotation 8 during operation by means of the drive unit, not shown, and as a result the lengths of the paths traveled by the beam halves become contrarily shorter and longer, or in other words their difference changes periodically and continuously back and forth between maximum and zero. In this embodiment, the attainable path difference and hence the spectral resolution are defined by the angle α and the plate thickness d.

The current path difference and hence the spectral resolution of the interferometer according to the invention be kept adjustable, because of the capability of varying the angle $\alpha$ or the plate thickness d in the second embodiment described above.

By a suitable choice of the size of all the components and their arrangement, it can be assured that the beams will entirely strike the reflective faces of all the mirrors involved in reflecting the beam halves. This is true particularly for the diameter of the mirror element $50_1$ or of its preferably circular or elliptical annular mirror faces.

FIG. 5, in a perspective view, shows a basic layout of the third embodiment that was schematically shown in FIG. 4. In a supplement to this schematic illustration of FIG. 4, the perspective view of FIG. 5 additionally shows retaining devices and a drive mechanism, while the optical focusing element 3 and the detector 4 are left out.

The circular mirror element $50_1$, or in the embodiment of FIG. 5 the preferably elliptical mirror element $50_1$, is mounted by its outer edge to one end of a hollow circular cylinder 11, shown in section in FIG. 5, in such a way that the cylinder axis and the normal to the mirror element $50_1$ form an angle $\alpha$ (see FIG. 1). A retaining and rotation disk 12, aligned vertically to the cylinder axis and in the form for instance of a toothed belt disk, is mounted on the other end of the circular cylinder 11.

The retaining disk 12 is rotatably supported about a stationary shaft $8_1$, which is fixed by the axis of rotation 8, which corresponds to the axis of the cylinder 11. The two plane mirrors $71_2$ and $72_2$ are secured to the shaft $8_1$. The retaining disk 12 and the mirror element $50_1$, connected to it via the hollow cylinder 11, are set to rotation by a drive disk 13, for instance in the form of a toothed belt disk, of a direct current motor, not shown, via a driving toothed belt 14. In the arrangement shown in FIG. 5, the beam paths of the split beams are not interrupted during operation.

The numerical figures given below are an example for dimensioning the most important parameters for a concentric frustoconical recesses in the mirror element $50_1$. In the second embodiment in FIG. 3, these should be as follows:

the usable diameter of a beam, 30 mm;

the plate thickness d, 20 mm;

the spacing between the two plane mirrors 91 and 92, 20 mm;

and the angle $\alpha$, 3.5°.

The maximum attainable path difference is then approximately 11 cm; the attained spectral resolution is better than 0.091 $cm^{-1}$; and the diameter of the mirror element $50_1$ becomes 260 mm.

If in the third embodiment of FIG. 4 the usable diameter of the beam is 30 mm, the plate thickness d is 20 mm, and the angle $\alpha$ is 4.0°, then the attainable maximum path difference is approximately 13 cm. The spectral resolution attained is better than 0.77 $cm^{-1}$, and the diameter of the mirror element $50_1$ is then 222 mm.

As shown in FIG. 6, a fourth embodiment of a Michelson interferometer has a beam splitter 1, an optical element 3, a detector 4, a mirror element $50_3$ for changing the path length, which has two plane mirrors $51_3$ and $52_3$ facing one another and parallel to one another, and two plane end mirrors $71_3$ and $72_3$. The two plane mirrors $51_3$ and $52_3$ of the mirror element are circular or elliptical plane mirrors, which have the same diameter and, as is not shown in detail in FIG. 6, are disposed at an adjustable distance a from one another and are solidly connected to one another in that position. The mirror element $50_3$ formed by the plane mirrors $51_3$ and $52_3$ can be set continuously into rotation about an axis of rotation $8_3$; the mirror faces of the two plane mirrors $51_3$, $52_3$ of the mirror element $50_3$ are inclined by a small angle $\alpha$ from the vertical to the axis of rotation $8_3$.

A drive shaft $80_3$, whose axis of rotation coincides with the axis of rotation $8_3$, is solidly joined to the outside of one of the two plane mirrors $51_3$ and $52_3$ (in FIG. 6, to the back side of the plane mirror $51_3$), and is driven at a constant angular speed via a motor, not shown in detail.

With respect to a center plane (not shown in detail) of the mirror element, the beam splitter 1 is disposed on one side of the mirror element $50_3$, while the end mirrors $71_3$ and $72_3$ are disposed on its other side. The beam splitter plane is thus located between the plane mirrors $51_3$ and $52_3$, and it bisects the angle formed by the end mirrors $71_3$ and $72_3$. The beam halves 10' and 10" of the two interferometer arms, which are concentric with their optical axes, strike the end mirrors $71_3$ and $72_3$ vertically.

During operation, an incident beam 10 is split by the beam splitter 1 by transmission and reflection, respectively, into two beam halves 10' and 10" of the same intensity. The beam half 10' strikes the plane mirror $51_3$, is reflected by it to the plane mirror $52_3$, and from there is finally reflected to the end mirror $71_3$ in such a way that it strikes it vertically. From the end mirror $71_3$, the beam half 10' takes the course described in the reverse direction to the beam splitter. The second beam half 10", arriving from the beam splitter 1, strikes the plane mirror $52_3$, is reflected by it to the plane mirror $51_3$ and from there finally to the end mirror $72_3$, where the beam half 10" strikes vertically, is reflected back into itself, and then takes the course described in the opposite direction, back to the beam splitter 1. The two beam halves striking the beam splitter 1 recombine at the beam splitter 1, and the resultant radiation is focused onto the detector 4 by the optical element 3.

In the rotation of the mirror element $50_3$, the paths described lengthen and shorten contrary to one another in the two interferometer arms, as a result of which the desired path difference is formed, which is adjustable by means of the magnitude of the angle $\alpha$ between the plane mirror surfaces and the vertical to the axis of rotation $8_3$ and the spacing a between the two plane mirrors $51_3$ and $52_3$.

In FIG. 7, schematically and in detail, a preferred fifth embodiment is shown, now of a mirror element $50_4$ that is modified over the mirror element $50_3$ of FIG. 6. In FIG. 7, a central bore is provided in each of the two plane mirrors $51_4$ and $52_4$ of the mirror element $50_4$; this bore is inclined by the angle $\alpha$ from the vertical to the mirror faces of the two plane mirrors $51_4$ and $52_4$. One drive shaft $80_4$, with an axis of rotation $8_4$ shown in dashed lines, is passed through each of these bores. The drive shaft $80_4$ is solidly joined, by means of two flanges 81 and 82, to outer faces of the two plane mirrors $51_4$ and $52_4$. With the aid of the flanges 81 and 82, the opposed mirror faces of the two plane mirrors $51_4$ and $52_4$ are disposed at a distance a from one another which is adjustable accordingly taking into account the dimensions of the usual elements.

By means of a drive motor, not shown in detail, the shaft $80_4$ and thus the mirror element $50_4$ can be set to rotation. The beam splitter 1, the mirror element $50_4$ and the end mirrors $71_3$ and $72_3$ are dimensioned and arranged such that the beams 10' and 10" (see FIG. 6) concentric to their optical axes travel unhindered by the rotational shaft $80_4$ through the interferometer of the invention in any rotary position of the mirror element $50_4$; in other words, the beams 10' and 10" extend within only one half of the mirror element $50_4$, if this element is divided into two halves by a plane in which the axis of rotation $8_4$ is also located.

In that case, the beam paths of the two beam halves are then not interrupted during operation. The second half of the mirror element, which in the embodiment described is not used, can thus be supplemented with a second arrangement of the usual components 1, 3, 4 and $71_3$, $72_3$ to make a second interferometer, which can serve as a reference interferometer, for instance, or may also be designed for a different spectral range.

In a modification of the embodiment described above in conjunction with FIG. 7; the second half of the mirror element $50_4$ can also be used for another passage therethrough of the two beam halves 10' and 10". In that case, unlike what FIG. 6 shows, the end mirrors $71_3$ and $72_3$ are then disposed on the side of the beam splitter 1 opposite the second half of the mirror element. At the position of the end mirrors $71_3$, $72_3$ each shown in FIG. 6, then either two plane mirrors or a roof top inner mirror is arranged in such a way that the two beams 10' and 10" are directed laterally offset via the second half of the mirror element $50_4$ to the end mirrors $71_3$ and $72_3$—which are now disposed on the side of the beam splitter 1—and which they then again likewise strike vertically. The two beam halves 10' and 10" strike the mirrors $51_3$ and $52_3$ twice each along this path. From the end mirrors $71_3$ and $72_3$—disposed on the side of the beam splitter 1—the beams then travel the above-described path back again to the beam splitter, twice intersecting the mirror element $50_4$ in the process. In the manner described above, the optical path difference obtainable with the fifth embodiment of FIG. 7 can be doubled.

In a further possible embodiment, a beam twice as wide can travel across the middle of the mirror element $50_4$ shown in FIG. 7. Of this beam, the drive shaft $80_4$ would then block out a portion corresponding to its width, or in other words correspondingly shade the two beam halves. However, in that way more radiation output, at the same geometrical dimensions, can reach the detector 4 (FIG. 6), or if the radiation capacity remains the same a geometrically smaller layout than in FIG. 7 can be achieved. Naturally, the drive shaft $80_3$ should be designed to be as thin as possible, in order to keep the entire layout small or keep the above-described blocking out of the radiation by the drive shaft $80_3$ as slight as possible.

FIG. 8, again only schematically, shows the layout of a preferred sixth embodiment of a mirror element structure modified compared with the embodiment of FIG. 6. In FIG. 8, the two plane mirrors $51_5$ and $52_5$ of the mirror element $50_5$ are disposed parallel to one another at the intended distance a and solidly joined to one another by means of two retaining elements 91 and 92 that in U-shaped fashion engage the outsides of the two plane mirrors $51_5$ and $52_5$. Thus the two U-shaped retaining elements 91 and 92 not only assure that a distance a between the two plane mirrors $51_5$ and $52_5$ is adhered to, but also that the two plane mirrors $51_5$ and $52_5$ exhibit the absolutely necessary parallelism to one another.

The mirror element $50_5$ is solidly joined, concentrically on the back side of one of the two plane mirrors $51_5$ or $52_5$ (in FIG. 8, the back of the plane mirror $51_5$), by means of a flange $81_5$, and the axis of rotation of this shaft again coincides with the axis of rotation, not shown in FIG. 8, of the mirror element. Also in FIG. 8, the drive shaft $80_5$, with a vertical to the mirror faces of the two plane mirrors $51_5$ and $52_5$, form a small angle α, not shown in FIG. 8. The drive shaft $80_5$ is set into rotation by a motor, not shown, which as in FIG. 7 is indicated by an arrow shown above the drive shaft $80_5$ and indicating the rotary motion.

The U-shaped retaining elements 91 and 92 are dimensioned in such a way and secured on the circumference of the plane mirrors $51_5$ and $52_5$ on the back sides thereof in such a way that despite the shading of the beam brought about by the retaining elements 91 and 92, upon a rotation of the mirror element $50_5$, two times at least 120° per 360° revolution are available for unhindered operation. The remaining angular beam path range of approximately two times 60° is covered by the retaining parts 91 and 92.

The path lengths through the two interferometer arms are adjusted and coordinated with one another by means of the end mirrors $71_3$ and $72_3$—shown only in FIG. 6—in such a way that of the course of the path change, whose speed has been sinusoidally modulated, the segments of 2 • 120° that are usable for the measurement are located symmetrically to both sides of the turning point of a sign curve, or in other words in its virtually linear region, so that as a result, at least approximately 87% of the entire optical path difference of one revolution of 360° is utilized for the measurement, which is equivalent to approximately 67% of the measurement time available for one revolution.

Numerical examples for dimensioning the most important parameters of the fourth through sixth embodiments are given below:

| | |
|---|---|
| diameter of the mirror element $50_3$, $50_4$ or $50_5$ | 280 mm |
| spacing a | 150 mm |
| angle α | ±4.5° |
| usable diameter of the beam | 50 mm |
| attainable maximum path difference | approx. 133 mm |
| path difference with 120° utilization | approx. 115 mm |

For an embodiment with a smaller path difference, the elements may be dimensioned approximately as follows:

| | |
|---|---|
| diameter of the mirror element $50_3$, $50_4$ or $50_5$ | 110 mm |
| spacing a | 55 mm |
| angle α | ±2.5° |
| usable diameter of the beam | 25.4 mm |
| attainable maximum path difference | approx. 27.1 mm |
| path difference with 120° utilization | approx. 23.5 mm |

By means of the invention, the fourth through sixth embodiments of interferometers are thus created with a rotating mirror element in which a high spectral resolution is attained with the aid of fewer optical components. Moreover, the components used are simple in embodiment and therefore economical. In addition, the small number of components required enables simple optical adjustment, so that the incidence of misadjustment can be expected to be extremely slight.

We claim:
1. A Michelson interferometer comprising:
   a beam splitter (1);
   two folding mirrors (21, 22);
   a focusing optical element (3);
   a laser for producing signal radiation;
   a detector (4) for detecting the signal radiation from said laser;
   a mirror unit (50) having an axis of rotation and which can be set into rotation by a drive unit (65), which axis of rotation is aligned in the same plane as the center plane of the beam splitter (1), which mirror unit (50) has two mutually parallel plane mirror surfaces, facing one another at a predetermined distance, by way of which both beams formed at the beam splitter (1) can be directed in order to change a path length;
   two stationary plane mirrors (71, 72), which are disposed on different, opposed sides of the axis of rotation of the mirror unit (50) such that all of the stationary plane mirrors make a same angle with the axis of rotation and are oriented at right angles to the beams arriving from the mirror unit 50;

wherein the two mirror surfaces of the mirror unit (50) include a larger plane mirror and a smaller plane mirror disposed eccentrically and parallel to one another;

a hollow shaft (63), rotatably supported in a bearing block (62) and driven by the drive unit (65), is provided, which is disposed between the beam splitter (1) and the mirror unit (50) and whose rotation axis (61) coincides with the axis of rotation of the mirror unit (50); and the mirror unit (50) is secured to the hollow shaft (63) such that the rotation axis (61) of the hollow shaft extends through a mirror face of the smaller plane mirror (51), the axis of rotation (61) forming an acute angle ($\beta$) with a vertical to the mirror face of the smaller plane mirror (51), so that the two beams formed at the beam splitter (1) travel via the two folding mirrors (21, 22), through the hollow shaft (63), to strike the centrally disposed mirror face of the smaller plane mirror (51), are reflected by it to an opposed mirror face of the larger plane mirror (52), and from there onto the two stationary plane mirrors (71, 72) in such a way that they strike the stationary plane mirrors (71, 72) vertically, are reflected in the reverse direction, are recombined at the beam splitter (1), and are focused on the detector (4) by means of the focusing optical element (3).

2. The interferometer of claim 1, wherein the mirror unit is a plane-parallel plate of a material transparent to the signal radiation, which plate has two opposed outer faces that include inwardly-oriented mirror faces in such a way that the face struck first by the two incident beams is mirror-coated only in that region, while the other face is entirely mirror-coated.

3. An interferometer according to claim 2, wherein the two plane mirrors are circular or elliptical.

4. A Michelson interferometer, comprising a beam splitter (1), a focusing optical element (3), a detector (4), a mirror element ($50_3$) that can be set into rotation, for varying a course length, the mirror element including two plane mirrors ($51_3$, $52_3$), facing one another and disposed parallel to one another, and two planar end mirrors ($71_3$, $72_3$), wherein the plane mirrors ($51_3$, $52_3$) of the mirror element ($50_3$) are circular, have the same diameter, and are solidly connected to one another at an adjustable spacing (a) with respect to a center plane of the mirror element, the center plane is disposed parallel to and midway between the plane mirrors, the beam splitter (1) is disposed on one side and the two end mirrors ($71_3$, $72_3$) are disposed on the other side of the mirror element ($50_3$) in such a way that the beam splitter plane is located between the plane mirrors ($51_3$, $52_3$) and bisects the angle is formed by the two end mirrors ($71_3$, $72_3$);

the surfaces of the plane mirrors are inclined by a small angle ($\alpha$) relative to the vertical to the axis of rotation ($8_3$) of the mirror element ($50_3$), and the axis of rotation ($8_3$) of the mirror element coincides with that of a drive shaft ($80_3$), which is solidly joined to the outside of one of the two plane mirrors ($51_3$ and $52_3$) of the mirror element ($50_3$), and which is drivable by a motor at a constant angular speed, so that an incident beam (10) is divided by the beam splitter (1) into two halves of equal intensity, each of the beam halves strikes one of the two plane mirrors ($51_3$ and $52_3$, are reflected to the respectively opposed plane mirror ($52_3$ and $51_3$ and from there finally to the end mirrors ($71_3$, $72_3$), in such a way that they strike the end mirrors ($71_3$, $72_3$) vertically, from there travel the path described in the reverse direction, are recombined at the beam splitter (1), and are carried to the detector (4) via the focusing lens (3), the path difference being adjustable by means of the magnitudes of the angle ($\alpha$) and spacing (a).

5. The interferometer of claim 4, wherein the two plane mirrors ($51_4$, $52_4$) of the mirror element ($50_4$) are each provided with a central bore, through which a drive shaft ($80_4$) is guided, which shaft is secured via two flanges (81, 82) to the respective outer faces of the mirrors ($51_4$, $52_4$) disposed parallel to one another at the spacing (a), in such a way that the plane mirrors ($51_4$, $52_4$) are inclined by the angle ($\alpha$) relative to the vertical to the axis of rotation ($8_4$), and the beam splitter (1), the mirror element ($50_4$), the end mirrors ($71_3$, $72_3$) and the diameter of the incident beam (10) are dimensioned and disposed in such a way that the beams (10', 10"), which are concentric to their optical axis, in each rotational position pass through only half of the mirror element ($50_4$) unhindered by the drive shaft ($80_4$).

6. The interferometer of claim 5, wherein the beam splitter (1), the mirror element ($50_4$), the end mirrors ($71_3$, $72_3$), and the diameter of the incident beam (10) are dimensioned and disposed such that the beams (10', 10"), which are concentric to their optical axes and originate from the incident beam (10), travel through the arrangement in such a way that the optical axes of the beam halves (10', 10") form a plane with the axis of rotation ($8_4$), and the drive shaft ($80_4$) as a result shields only a central portion of the beam.

7. The interferometer of claim 4, wherein the two plane mirrors ($51_5$, $52_5$) are fixed parallel to one another at a predetermined distance (a) from one another on opposed sides with two U-shaped retaining elements (91, 92) engaging them, concentrically with the back side of one of the two plane mirrors ($51_5$, $52_5$) of the mirror element ($50_5$), a drive shaft ($80_5$) is secured via a flange ($81_5$), the axis of rotation of the drive shaft forming the small angle ($\alpha$) with the vertical to the mirror faces of the plane mirrors ($51_5$, $52_5$), and the U-shaped retaining elements (91, 92) are dimensioned such that despite the shading of the beam effected by the retaining elements (91, 92) upon rotation of the mirror element ($50_5$), an angle of at least twice 120° each is available per revolution for unhindered operation, so that the path length, established by the two interferometer arms by means of the end mirrors ($71_3$, $72_3$), are coordinated with one another such that from the course of the sinusoidally modulated path change, the segments usable for the measurement, of twice 120°, are located symmetrically to both sides of the turning point of the sinusoidal curve and thus in the virtually linear region thereof, so that as a result approximately 87% of the entire optical difference and approximately 67% of the entire time of one revolution are usable for a measurement.

* * * * *